(No Model.)

J. LACHANCE.
NUT LOCK.

No. 543,027. Patented July 23, 1895.

Witnesses
Walter Allen

Inventor
Joseph Lachance
By Attorney Herbert W. Jenner.

UNITED STATES PATENT OFFICE.

JOSEPH LACHANCE, OF ST. FRANÇOIS, CANADA.

NUT-LOCK.

SPECIFICATION forming part of Letters Patent No. 543,027, dated July 23, 1895.

Application filed June 8, 1894. Serial No. 513,974. (No model.) Patented in Canada April 7, 1894, No. 46,737.

*To all whom it may concern:*

Be it known that I, JOSEPH LACHANCE, a citizen of the Dominion of Canada, residing at St. François, in the county of Beauce and Province of Quebec, Canada, have invented a new and useful Nut-Lock, (for which I have obtained a patent in Canada, No. 45,737, bearing date April 7, 1894,) of which the following is a specification.

Figure 1:
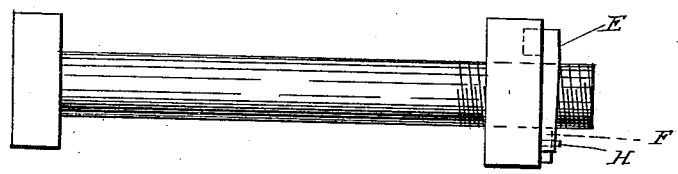
Figures 2, 3, 4:
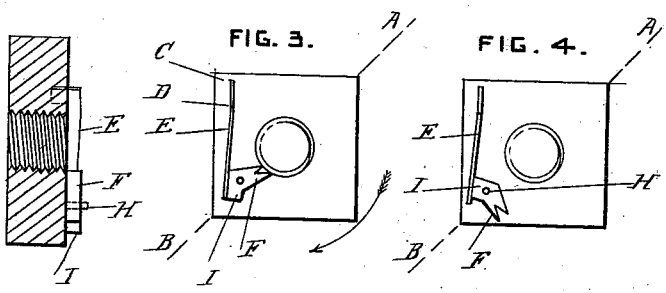

In the drawings, Figure 1 is a side view of a bolt with the nut-lock applied to it. Fig. 2 is a section through the nut, taken on the line A B in Figs. 3 and 4. Figs. 3 and 4 are plan views of the nut, showing the locking device in and out of engagement with the screw-thread on the bolt, respectively.

E is a spring which is rigidly secured to the upper face of the nut at one end from C to D.

F is a disengageable catch pivoted on the pin H, projecting from the nut and provided with teeth which engage with the screw-thread on the bolt. The free end of the spring E bears against the side of the catch and presses its teeth against the screw-threads, permitting the nut to be tightened up, but preventing it from being turned in the reverse direction, as indicated by the arrow in Fig. 3.

I is a rectangular projection upon the catch. When this projection is pressed hard enough to revolve the catch upon its pivot-pin against the pressure of the spring, the teeth of the catch are disengaged from the screw-threads and the catch is sustained by the spring in the position shown in Fig. 4, thus permitting the nut to be unscrewed from the bolt.

The spring bears against the side of the catch and its projection when the catch is in engagement and against the end portion of the projection when the catch is out of gear with the screw-thread of the bolt.

What I claim is—

The combination, with a bolt, and its nut; of a toothed catch pivoted to the nut and provided with a rectangular projection, and a spring secured at one end to the nut with its free end bearing against the side of the catch and its projection and normally pressing its teeth against the screw-thread on the bolt, the said catch being disengaged when the said projection is pressed back until the spring bears against the end portion of the said projection, substantially as described and shown.

JOSEPH LACHANCE.

Witnesses:
 N. A. BOIRIN,
 PHILIPPE ANGERS.